United States Patent
Kwag

(10) Patent No.: US 11,025,869 B2
(45) Date of Patent: Jun. 1, 2021

(54) IMAGE SENSOR, IMAGE SENSOR PROCESSOR, AND IMAGE PROCESSING SYSTEM INCLUDING THE SAME

(71) Applicant: SK hynix Inc., Icheon-si (KR)

(72) Inventor: Pyong Su Kwag, Eumseong-gun (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/707,623

(22) Filed: Dec. 9, 2019

(65) Prior Publication Data
US 2021/0044783 A1 Feb. 11, 2021

(30) Foreign Application Priority Data
Aug. 8, 2019 (KR) .......................... 10-2019-0096753

(51) Int. Cl.
*H04N 9/04* (2006.01)
(52) U.S. Cl.
CPC .............................. *H04N 9/04515* (2018.08)
(58) Field of Classification Search
CPC . H04N 9/04515; H04N 9/04555; H04N 9/045
See application file for complete search history.

(56) References Cited

U.S. PATENT DOCUMENTS

| 4,500,914 | A | * | 2/1985 | Watanabe | .......... H04N 9/04557 348/280 |
| 4,580,160 | A | * | 4/1986 | Ochi | .................... H04N 5/3696 348/276 |
| 4,768,085 | A | * | 8/1988 | Hashimoto | ........ H04N 9/04557 348/237 |
| 7,477,304 | B2 | * | 1/2009 | Hu | ..................... H04N 9/04555 348/272 |
| 8,059,175 | B2 | * | 11/2011 | Park | ...................... H04N 5/235 348/276 |
| 2008/0068477 | A1 | * | 3/2008 | Iida | .................... H04N 9/04555 348/294 |
| 2014/0063300 | A1 | * | 3/2014 | Lin | .................... H04N 9/04515 348/277 |
| 2017/0163951 | A1 | * | 6/2017 | Getman | ............. H04N 9/04555 |

FOREIGN PATENT DOCUMENTS

KR 10-2017-0067123 6/2017
KR 10-2018-0082315 7/2018

* cited by examiner

*Primary Examiner* — Jason A Flohre
(74) *Attorney, Agent, or Firm* — Perkins Coie LLP

(57) ABSTRACT

An image sensor, an image signal processor, and an image processing system including the same are disclosed. The image sensor includes an active pixel sensor (APS) block provided with a (3×3) matrix in which three red color pixels, three blue color pixels, and three white color pixels are contained, and a data generation block configured to generate pixel data of each of the red color pixels, pixel data of each of the blue color pixels, and pixel data of each of the white color pixels.

13 Claims, 9 Drawing Sheets

| PG1a | | |
|---|---|---|
| R | W | B |
| B | R | W |
| W | B | R |

FIG. 5A

| PG1b | | |
|---|---|---|
| W | B | R |
| R | W | B |
| B | R | W |

FIG. 5B

| PG1c | | |
|---|---|---|
| B | R | W |
| W | B | R |
| R | W | B |

FIG. 5C

| R11 | W12 | B13 | R14 | W15 | B16 |
|---|---|---|---|---|---|
| B21 | R22 | W23 | B24 | R25 | W26 |
| W31 | B32 | R33 | W34 | B35 | R36 |
| R41 | W42 | B43 | R44 | W45 | B46 |
| B51 | R52 | W53 | B54 | R55 | W56 |
| W61 | B62 | R63 | W64 | B65 | R66 |

700

MSK1, MSK2

FIG.7

IMAGE SENSOR, IMAGE SENSOR PROCESSOR, AND IMAGE PROCESSING SYSTEM INCLUDING THE SAME

CROSS-REFERENCE TO RELATED APPLICATION

This patent document claims the priority and benefits of Korean patent application No. 10-2019-0096753, filed on Aug. 8, 2019, the disclosure of which is incorporated herein by reference in its entirety as part of the disclosure of this patent document.

TECHNICAL FIELD

The technology and implementations disclosed in this patent document generally relate to an image sensor, an image signal processor, and an image processing system including the same.

BACKGROUND

An image sensor is a device that captures light from an optical image or one or more objects using photosensitive semiconductor elements and converts the captured color light into electrical signals. With the development of automotive, medical, computer, and communication industries, the demand for high-performance image sensors is increasing in various devices such as smartphones, digital cameras, game consoles, Internet of Things (IoT), robots, surveillance cameras, medical micro-cameras, etc.

One very common type of image sensing device is a charge coupled device (CCD), which has dominated the field of image sensors for a long time. Another common type of image sensing device is a complementary metal oxide semiconductor (CMOS) image sensing device. CCD image sensors have advantages over the CMOS image sensor in terms of noise characteristics and image quality. However, CMOS image sensors are now widely used due to certain advantages over the CCD counterparts, including, e.g., higher frame rates and shutter speed. In addition, CMOS image sensors and signal processing circuitry can be integrated into a single chip, making it possible to miniaturize electronic devices while achieving lower power consumption. In addition, using the CMOS fabrication technology can result in reduction in the production costs. Such characteristics of CMOS image sensors make these sensors better suited for implementations in mobile devices.

SUMMARY

The embodiments of the disclosed technology, among other features and benefits, relate to an image sensor that can generate RGB image data using a white color pixel instead of a green color pixel.

Some embodiments of the disclosed technology relate to an image sensor that includes an active pixel sensor block including a 3×3 matrix in which three red color pixels, three blue color pixels, and three white color pixels are arranged.

In an embodiment of the disclosed technology, an image sensor may include an active pixel sensor (APS) block provided with a (3×3) matrix in which three red color pixels, three blue color pixels, and three white color pixels are contained, and a data generation block configured to generate pixel data of each of the red color pixels, pixel data of each of the blue color pixels, and pixel data of each of the white color pixels.

In another embodiment of the disclosed technology, an image processing system may include an active pixel sensor (APS) block provided with a (3×3) matrix in which three red color pixels, three blue color pixels, and three white color pixels are contained, and an image signal processor configured to perform demosaicing for each demosaicing matrix in which the three red color pixels, the three blue color pixels, and the three white color pixels are contained.

In another embodiment of the disclosed technology, an image signal processor may include a line memory configured to temporarily store image data that includes pixel data of each red color pixel, pixel data of each blue color pixel, and pixel data of each white color pixel, and a processing block configured to perform demosaicing of the image data in units of a demosaicing matrix in which three red color pixels, three blue color pixels, and three white color pixels are contained. The pixel data may be generated by an active pixel sensor (APS) block provided with a (3×3) matrix in which the three red color pixels, the three blue color pixels, and the three white color pixels are contained.

In another embodiment of the disclosed technology, an image sensor includes an active pixel sensor (APS) block including a plurality of (3×3) matrices of imaging pixels arranged in columns and rows, each (3×3) matrix including three red color pixels, three blue color pixels, and three white color pixels, a data generation block configured to generate pixel data of each of the red color pixels, pixel data of each of the blue color pixels, and pixel data of each of the white color pixels.

In another embodiment of the disclosed technology, an image processing system includes an active pixel sensor (APS) block including a plurality of (3×3) demosaicing matrices of imaging pixels arranged in columns and rows, each (3×3) matrix including three red color pixels, three blue color pixels, and three white color pixels, and an image signal processor configured to perform demosaicing for each of the demosaicing matrices.

In another embodiment of the disclosed technology, an image signal processor includes a line memory configured to temporarily store image data that includes pixel data of each red color pixel, pixel data of each blue color pixel, and pixel data of each white color pixel, and a processing block configured to perform demosaicing of the image data on a demosaicing matrix basis, each demosaicing matrix including three red color pixels, three blue color pixels, and three white color pixels. The pixel data may be generated by an active pixel sensor (APS) block including a plurality of (3×3) matrices of imaging pixels arranged in columns and rows, each (3×3) matrix including the three red color pixels, the three blue color pixels, and the three white color pixels.

BRIEF DESCRIPTION OF THE DRAWINGS

FIGS. 5A, 5B, and 5C illustrate examples of a first pixel group shown in FIG. 4.

FIG. 7 is a conceptual diagram illustrating a detailed example of the demosaicing method shown in FIG. 6.

DETAILED DESCRIPTION

Figure 1:
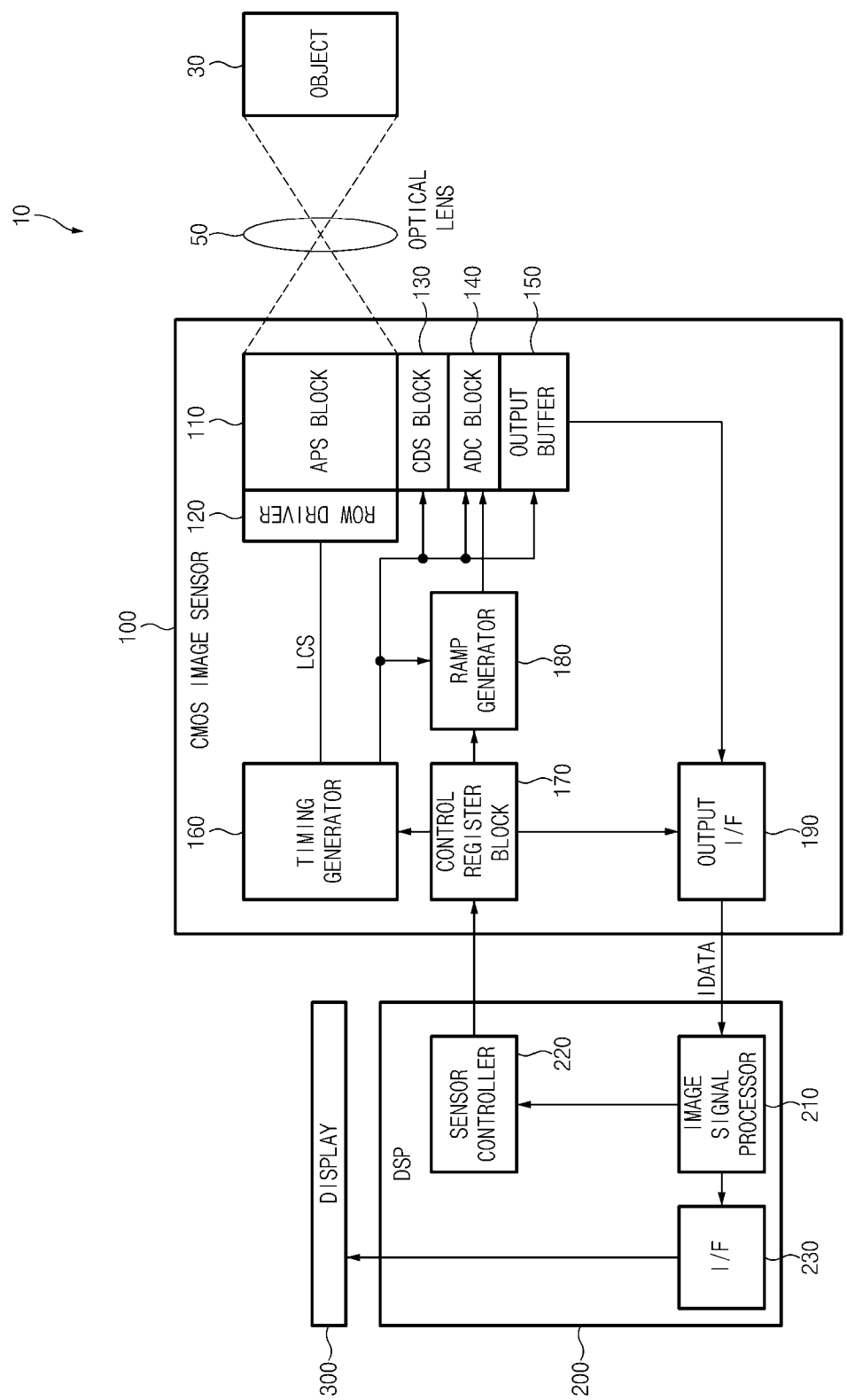
FIG. 1 is a block diagram illustrating an image processing system based on an embodiment of the disclosed technology.

FIG. 1 is a block diagram illustrating an image processing system 10 based on an embodiment of the disclosed technology.

In some implementations, the image processing system 10 include electronic devices that coverts optical images into electrical information and performs some operations on the electrical information to obtain an enhanced image or to extract some useful information. Examples of such electronic devices include a digital camera, a mobile phone, a smartphone, a tablet personal computer (PC), a laptop, a personal digital assistant (PDA), an enterprise digital assistant (EDA), a digital still camera, a digital video camera, a portable multimedia player (PMP), a mobile Internet device (MID), a personal computer (PC), a wearable device, other cameras having various purposes (e.g., a front-view camera, a rear-view camera, a black box, etc. of a vehicle), etc.

The image processing system 10 may include an optical lens 50, a CMOS image sensor 100, a digital signal processor (DSP) 200, and a display 300.

The CMOS image sensor 100 may generate image data IDATA based on an optical image of a targeted object 30 captured through the optical lens 50, and may transmit image data IDATA to the DSP 200. The optical lens 50 may include at least one lens configured to form an optical system.

The CMOS image sensor 100 may include an active pixel sensor (APS) block 110, a row driver 120, a correlated double sampling (CDS) block 130, an analog-to-digital converter (ADC) block 140, an output buffer 150, a timing generator 160, a control register block 170, a ramp generator 180, an output interface (I/F) 190. In this case, the above-mentioned constituent elements of the CMOS image sensor 100 are merely examples, and one or more constituent elements may be added or omitted as necessary. If necessary, a plurality of constituent elements may be integrated into a single device such as a single semiconductor device.

The APS block 110 may include a plurality of pixels arranged in rows and columns. Each of the pixels arranged in the APS block 110 may generate photocharges in response to incident light, and may generate a pixel signal corresponding to the stored photocharges. Each of the pixels may include a photoelectric conversion element to convert incident light into an electrical signal, and at least one transistor to pass or amplify the electrical signal. For example, the photoelectric conversion element may include a photodiode (PD), a phototransistor, a photogate, a pinned photodiode, etc. Each pixel may be driven in response to a pixel control signal output from the row driver 120, and the electrical signal detected by each pixel may be transmitted to the CDS block 130 through a plurality of column lines (not shown). Types of pixel control signals may vary depending on structures of respective pixels (e.g., 3T, 4T, 5T, etc.). For example, in the case of using the 4T pixel, the pixel control signal may include a reset control signal, a transmission (Tx) control signal, and a selection control signal.

A color filter array may be disposed between the APS block 110 and the optical lens 50, and may include a plurality of color filters configured to allow only specific wavelengths (e.g., red, blue, and green) incident upon the respective pixels to pass therethrough while blocking the other wavelengths. Due to the color filter array, pixel data from each pixel may have a value corresponding to light intensity of a specific wavelength, and for this reason, in the context of this patent document, each pixel may be referred to as a red color pixel (R), a blue color pixel (B), a green color pixel (G), or a white color pixel (W) according to types of the color filters.

Since the green color pixel (G) absorbing a wavelength corresponding to green light may have a lower light absorption rate as compared to other pixels R and B, the number of green color pixels (G) per unit area is higher than the number of other pixels R and B per unit area in the same manner as in a Bayer pattern. Even in the case, the light absorption rate is low in level, such that light sensitivity of the image sensor may be deteriorated due to the low light absorption rate. Therefore, some embodiments of the disclosed technology can be implemented to provide the image processing system 10 including the white color pixel (W) having a relatively high light absorption rate, instead of the green color pixel (G). In addition, although the image sensor based on some embodiments of the disclosed technology includes the white color pixel (W), and it should be noted that any color pixel that has a relatively high light absorption rate as compared to the green color pixel may also be used in place of, or instead of the white color pixel (W).

The row driver 120 may transmit a plurality of pixel control signals for controlling the respective pixels to the APS block 110 based on a line control signal LCS received from the timing generator 160. In more detail, the row driver 120 may generate the selection control signal to select any one of the plurality of rows of the APS block 110. The row driver 120 may transmit the reset control signal and the transmission control signal to pixels corresponding to the selected row. As a result, an analog-type reference signal (or a reset signal) and an image signal that are generated from the pixels of the selected row may be transmitted to the CDS block 130. In the context of this patent document, the reference signal and the image signal that are output from the pixels are called "pixel signal."

CMOS image sensors may use the correlated double sampling (CDS) to remove an undesired offset value of pixels by sampling a pixel signal twice to remove the difference between these two samples. In one example, the correlated double sampling (CDS) may remove the undesired offset value of pixels by comparing pixel output voltages obtained before and after a light signal is incident on the pixels so that only pixel output voltages based on the incident light can be measured. In some embodiments of the disclosed technology, the CDS block 130 may sequentially sample and hold a set of the reference signal and the image signal that are transferred from the APS block 110 to each of the column lines. That is, the CDS block 130 may sample and hold voltage levels of the reference signal and the image signal that correspond to each column.

The ADC block is used to convert analog CDS signals to digital signals. Examples of the ADC 140 may include a ramp-compare type ADC where the analog pixel signal is compared a ramp signal that ramps up or down and a timer counts until a voltage of the ramp signal matches the analog pixel signal. In some embodiments of the disclosed technology, the ADC block 140 may receive a correlated double sampling (CDS) signal for each column from the CDS block 130, may convert the received CDS signal into a digital signal to output pixel data based on the digital signal. For this purpose, the ADC block 140 may include comparators and counters that are allocated to the columns, respectively. In addition, the ADC block 140 may receive a ramp signal from the ramp generator 180 to operate the comparator.

The CDS block 30 and the ADC block 140 will hereinafter be generically called a data generation block that generates pixel data of each of the red color pixel (R), the blue color pixel (B), and the white color pixel (W).

The output buffer 150 may receive pixel data for each column from the ADC block 140, may latch the received pixel data, and may output the latched pixel data. The output buffer 150 may temporarily store pixel data that is output from the ADC block 140, and may sequentially output pixel data in response to a control signal received from the timing generator 160.

The timing generator 160 may transmit a timing signal, a reference signal, and a control signal that are needed to generate and output image data to the constituent elements of the CMOS image sensor 100 in response to a control signal received from the control register block 170. In more detail, the timing generator 160 may output the line control signal LCS to the row driver 120 in a manner that pixel signals can be output in parallel from the pixels corresponding to the selected row line from among the plurality of row lines. The timing generator 160 may control the CDS block 130, the ADC block 140, and the output buffer 150 in a manner that pixel data corresponding to the selected column line from among the plurality of column lines can be sequentially output. The timing generator 160 may control the ramp generator 180 in a manner that the ADC block 140 can generate a ramp signal needed to perform analog-to-digital conversion (ADC).

The control register block 170 may control the timing generator 160, the ramp generator 180, and the output interface (I/F) 190 in response to a control signal received from the DSP 200.

The ramp generator 180 may generate a ramp signal in response to a control signal of the timing generator 160, and may transmit the generated ramp signal to the ADC block 140.

The output interface 190 may receive pixel data from the output buffer 150, and may transmit image data IDATA corresponding to the received pixel data to the DSP 200. In other words, the image data IDATA may include pixel data of each of pixels contained in the APS block 110.

The DSP 200 may include an image signal processor (ISP) 210, a sensor controller 220, and an interface (I/F) 230.

The image signal processor 210 may control the sensor controller 220 for controlling the control register block 170, and the interface 230. In an embodiment, the CMOS image sensor and the DSP 200 can be integrated into a single package (e.g., a multi-chip package). In another embodiment, the CMOS image sensor and the image signal processor may be integrated into a single semiconductor chip. Specifically, the DSP 200 implemented as an independent chip may also be referred to as an ISP chip.

The image signal processor 210 may perform signal processing of image data IDATA received from the output interface 190, and may transmit the processed image data to the interface 230. In this case, the signal processing may include various kinds of processing (e.g., demosaicing, hue correction, image quality correction, size adjustment, etc.) capable of improving image quality. Specifically, the image signal processor 210 may perform demosaicing per demosaicing matrix. In this case, the demosaicing matrix may be a (3×3) matrix in which three red color pixels (R), three blue color pixels (B), and three white color pixels (W) are contained. The demosaicing matrix may include, for example, first to fourth pixel groups PG1-PG4 to be described later or first and second masks MSK1 and MSK2 to be described later.

The sensor controller 220 may generate various control signals needed to control the control register block 170 under control of the image signal processor 210.

The interface 230 may transmit image data processed by the image signal processor 210 to the display 300.

The display 300 may display image data received from the interface 230. For example, the display 300 may be implemented as a thin film transistor-liquid crystal display (TFT-LCD), a light emitting diode (LED) display, an organic LED (OLED) display, or an active-matrix OLED (AMOLED) display. For example, although the DSP 200 shown in FIG. 1 is illustrated as sending image data to the display 300, it should be noted that the DSP 200 can also transmit such image data to a processor such as a central processing unit (CPU) or an application processor (AP) for further processing.

Figure 2A:
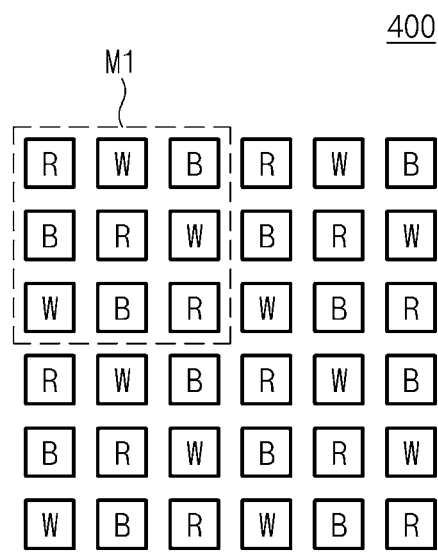
FIG. 2A is a schematic diagram illustrating a pixel array based on an embodiment of the disclosed technology.

FIG. 2A is a schematic diagram illustrating a pixel array based on an embodiment of the disclosed technology.

In some embodiments of the disclosed technology, the APS block 110 shown in FIG. 1 may include a first pixel array 400 as shown in FIG. 2A. Although FIG. 2A illustrates only 36 pixels arranged in a (6×6) matrix for convenience of description, all the pixels in the APS block 110 will be arranged in a larger matrix. In some implementations, the pixels in the first pixel array 400 may be arranged in different matrices having different patterns.

The first pixel array 400 may include at least one red color pixel (R), at least one blue color pixel (B), and at least one white color pixel (W). As described above, the red color pixel (R) may include a red color filter configured to pass a wavelength band corresponding to red color, the blue color pixel (B) may include a blue color filter configured to pass a wavelength band corresponding to blue color, and the white color pixel (W) may include a white color filter configured to pass a wavelength band corresponding to white color.

In the first pixel array 400, three randomly selected pixels successively arranged in a row direction may include a red color pixel (R), a blue color pixel (B) and a white color pixel (W), respectively. Likewise, three randomly selected pixels successively arranged in a column direction may include a red color pixel (R), a blue color pixel (B) and a white color pixel (W), respectively.

Referring to a first row of the first pixel array 400, the red color pixel (R), the white color pixel (W), and the blue color pixel (B) may be sequentially arranged in a manner that such "RWB" sequences are repeated in the first row.

Referring to a first column of the first pixel array 400, the red color pixel (R), the blue color pixel (B), and the white color pixel (W) may be sequentially arranged in a manner that such "RBW" sequences are repeated in the first column.

A (3×3) matrix selected from the first pixel array 400 may include three red color pixels (R), three blue color pixels (B), and three white color pixels (W). More specifically, 12 red color pixels (R), 12 blue color pixels (B), and 12 white color pixels (W) may constitute the (6×6) matrix.

If the pixels (i.e., pixels in the pixel array) are arranged in a Bayer pattern with 50% green, 25% red and 25% blue, there will be more green color pixels than blue or red color pixels. For example, 9 red color pixels (R), 9 blue color pixels (B), and 18 green color pixels (G) will constitute a (6×6) matrix. This is because light absorption rate of the green color pixel (G) is relatively low. This results in a reduction of the amount of information about the red color's wavelength range and the amount of information about the blue color's wavelength range.

However, the first pixel array 400 including the same number of red color pixels (R), blue color pixels (B), and color pixels (W) arranged in a (3K×3K) matrix (where, K is a positive(+) integer) may obtain the same amount of information from the red color pixels (R), blue color pixels (B), and white color pixels (W). As a result, color information about the red and blue colors may be less deteriorated than the pixel array based on the Bayer pattern. This is because the white color pixel (W) has substantially the same light absorption rate as the red color pixel (R) and the blue color pixel (B). Color information about the green color can be calculated using pixel signals of the red color pixel (R), the blue color pixel (B), and the white color pixel (W). The above-mentioned calculation method will hereinafter be described with reference to the attached drawings.

On the other hand, the first pixel array 400 will hereinafter be referred to as an RWB array based on the order of the red color pixel (R), the white color pixel (W), and the blue color pixel (B) that are arranged in the row direction.

In some implementations, the first pixel array 400 may further include another pixel array in which pixels are vertically (or horizontally) symmetrical to each other.

Figure 2B:
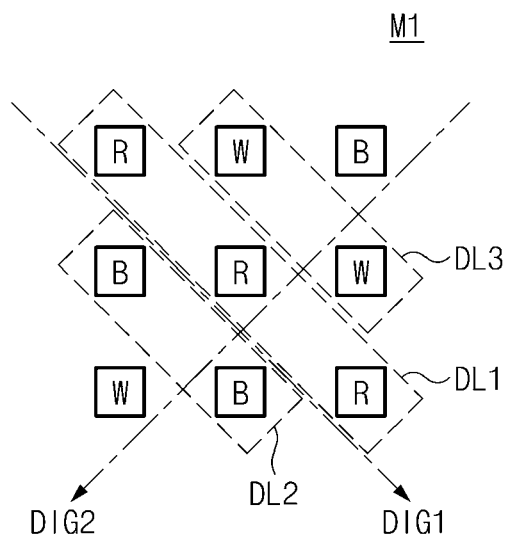
FIG. 2B is a schematic diagram illustrating some parts of a pixel array shown in FIG. 2A based on an embodiment of the disclosed technology.

FIG. 2B is a schematic diagram illustrating some parts of the pixel array shown in FIG. 2A based on an embodiment of the disclosed technology.

The (3×3) matrix M1 that is arbitrarily selected from among the first pixel array 400 shown in FIG. 2A will hereinafter be described with reference to FIG. 2B. Although FIG. 2B illustrates only the (3×3) matrix M1 for convenience of description, it should be noted that the features of the (3×3) matrix discussed here can be applied to other portions of the first pixel array 400.

In the (3×3) matrix M1, nine pixels are arranged in three rows and three columns. In some embodiment, three red color pixels (R), three blue color pixels (B), and three white color pixels (W) are arranged in the (3×3) matrix M1. As will be discussed below, this arrangement enables a demosaicing operation that is performed using a pixel group or a mask of the image signal processor 210.

The pixels in the (3×3) matrix M1 may be arranged in a first diagonal line DL1, a second diagonal line DL2, and a third diagonal line DL3. The first diagonal line DL1 may pass through a center point of the (3×3) matrix M1, and may include a plurality of first-color pixels arranged in a first diagonal direction DIG1. The second diagonal line DL2 may be arranged at the left side of the first diagonal line DL1, and second-color pixels may be arranged in the first diagonal direction DIG1. The third diagonal line DL3 may be arranged at the right side of the first diagonal line DL1, and third-color pixels may be arranged in the first diagonal direction DIG1. In addition, the third-color pixels may be arranged at the left side of the second diagonal line DL2, and the second-color pixels may be arranged at the right side of the third diagonal line DL3.

In this case, the first color, the second color, and the third color may be different in color from one another, and each of the first color, the second color, and the third color may be any one of red, blue, and white. As can be seen from FIG. 2B, the first color may be a red color, the second color may be a blue color, and the third color may be a white color.

In addition, in the (3×3) matrix M1, the red color pixels (R), the blue color pixels (B), and the white color pixels (W) are alternately arranged in the second diagonal direction DIG2 perpendicular to the first diagonal direction DIG1.

In another implementation, the first pixel array 400 is configured such that pixels are vertically (or horizontally) symmetrical to each other, and the first and second diagonal directions DIG1 and DIG2 and the first to third diagonal lines DL1-DL3 may be reversed symmetrically.

Figure 3A:
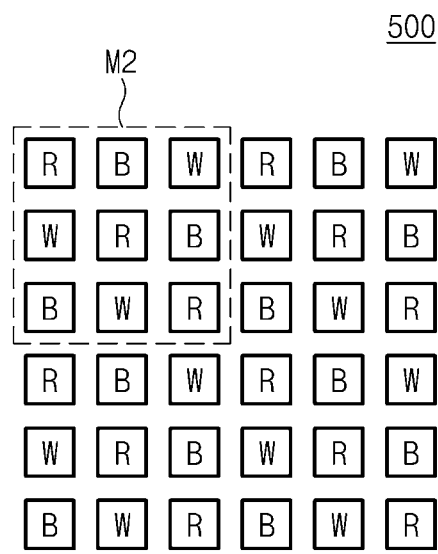
FIG. 3A is a schematic diagram illustrating a pixel array based on another embodiment of the disclosed technology.

FIG. 3A is a schematic diagram illustrating the pixel array based on another embodiment of the disclosed technology.

In some embodiments of the disclosed technology, the APS block 110 shown in FIG. 1 may include a second pixel array 500 as shown in FIG. 3A. Although FIG. 3A illustrates only 36 pixels arranged in a (6×6) matrix for convenience of description, all the pixels in the APS block 110 will be arranged in a larger matrix. In some implementations, the pixels in the second pixel array 500 may be arranged in different matrices having different patterns.

The second pixel array 500 may include a red color pixel (R), a blue color pixel (B), and a white color pixel (W).

In the second pixel array 500, three pixels successively arranged in a row direction may respectively include a red color pixel (R), a blue color pixel (B) and a white color pixel (W) in the same manner as in the first pixel array 400. In addition, three pixels successively arranged in a column direction may include a red color pixel (R), a blue color pixel (B) and a white color pixel (W), respectively.

Referring to a first row of the second pixel array 500, the red color pixel (R), the blue color pixel (B), and the white color pixel (W) may be sequentially arranged in a manner that such "RBW" sequences are repeated.

Referring to a first column of the second pixel array 500, the red color pixel (R), the white color pixel (W), and the blue color pixel (B) may be sequentially arranged in a manner that such "RWB" sequences are repeated.

A (3×3) matrix selected from the second pixel array 500 may include three red color pixels (R), three blue color pixels (B), and three white color pixels (W). More specifically, 12 red color pixels (R), 12 blue color pixels (B), and 12 white color pixels (W) may constitute the (6×6) matrix.

The second pixel array 500 including the same number of red color pixels (R), blue color pixels (B), and white color pixels (W) arranged in a (3K×3K) matrix (where, K is a positive(+) integer) may obtain the same amount of information from the red color pixels (R), blue color pixels (B), and white color pixels (W). As a result, color information about the red color and blue color may be less deteriorated than the pixel array based on the Bayer pattern.

On the other hand, the second pixel array 500 will hereinafter be referred color to as an RBW array based on the order of the red color pixel (R), the blue color pixel (B), and the white color pixel (W) that are arranged in the row direction.

In some implementations, the second pixel array 500 may further include another pixel array in which pixels are vertically (or horizontally) symmetrical to each other.

Figure 3B:
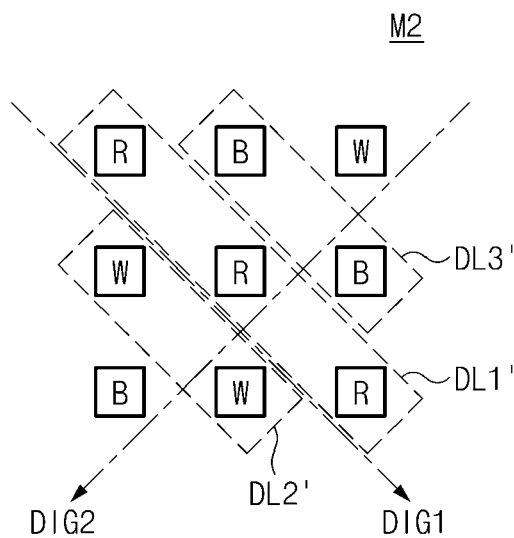
FIG. 3B is a schematic diagram illustrating some parts of a pixel array based on another embodiment of the disclosed technology.

FIG. 3B is a schematic diagram illustrating some parts of the pixel array based on another embodiment of the disclosed technology.

The (3×3) matrix M2 that is arbitrarily selected from among the second pixel array 500 shown in FIG. 3A will hereinafter be described with reference to FIG. 3B. Although FIG. 3B illustrates only the (3×3) matrix M2 for convenience of description, it should be noted that the features of the (3×3) matrix discussed here can be applied to other portions of the second pixel array 500.

In the (3×3) matrix M2, three red color pixels (R), three blue color pixels (B), and three white color pixels (W) are arranged. As will be discussed below, this arrangement enables the demosaicing operation that is performed using a pixel group or a mask of the image signal processor 210.

The pixels in the (3×3) matrix M2 may be arranged in a first diagonal line DL1', a second diagonal line DL2', and a third diagonal line DL3'. The first diagonal line DL1' may pass through a center point of the (3×3) matrix M2, and may include a plurality of first-color pixels arranged in a first diagonal direction DIG1. The second diagonal line DL2' may be arranged at the left side of the first diagonal line DL1', and second-color pixels may be arranged in the first diagonal direction DIG1. The third diagonal line DL3' may be arranged at the right side of the first diagonal line DL1', and third-color pixels may be arranged in the first diagonal direction DIG1. In addition, the third-color pixels may be arranged at the left side of the second diagonal line DL2', and the second-color pixels may be arranged at the right side of the third diagonal line DL3'.

In this case, the first color, the second color, and the third color may be different in color from one another, and each of the first color, the second color, and the third color may be any one of three colors (i.e., red, blue, and white). As can be seen from FIG. 3B, the first color may be a red color, the second color may be a blue color, and the third color may be a white color.

In addition, in the (3×3) matrix M2, the red color pixels (R), the blue color pixels (B), and the white color pixels (W) are alternately arranged in the second diagonal direction DIG2 perpendicular to the first diagonal direction DIG1.

In another implementation, the second pixel array 500 is configured such that pixels are vertically (or horizontally) symmetrical to each other, and the first and second diagonal directions DIG1 and DIG2 and the first to third diagonal lines DL1-DL3 may be reversed symmetrically.

Figure 4:
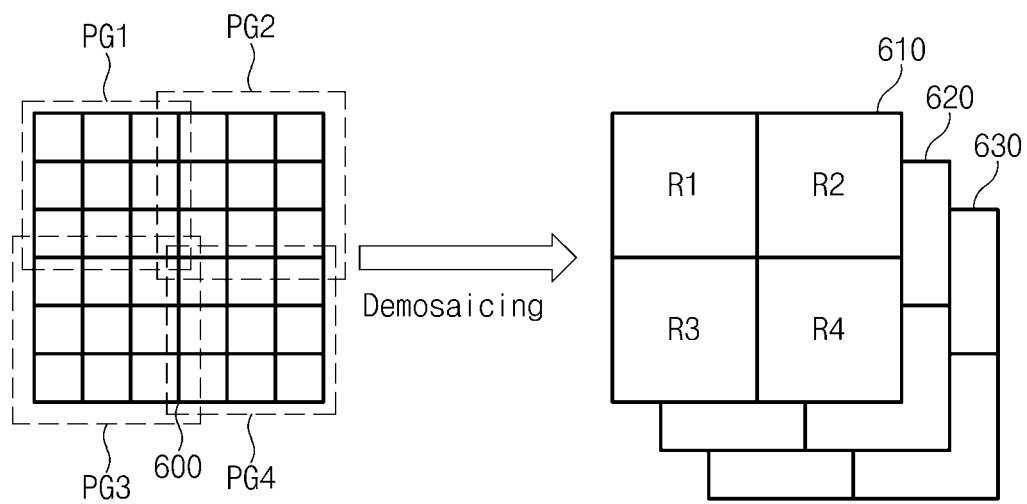
FIG. 4 is a schematic diagram illustrating a method for demosaicing pixels of a first pixel array or pixels of a second pixel array based on an embodiment of the disclosed technology.

FIG. 4 is a schematic diagram illustrating a method for demosaicing pixels of a first pixel array or pixels of a second pixel array based on an embodiment of the disclosed technology. FIGS. 5A, 5B, and 5C illustrate examples of the first pixel group shown in FIG. 4.

Image data 600 of the pixels that are arranged based on either the first pixel array 400 or the second pixel array 500 are shown in FIG. 4. The image data 600 may include pixel data of pixels arranged in the (6×6) matrix. The image data 600 may include first to fourth pixel groups PG1-PG4, each of which is arranged in the (3×3) matrix. Image data 600 having a (6×6) resolution may be demosaiced into RGB data (e.g., 610, 620, and 630), each of which has a (2×2) resolution.

In this case, the term "demosaicing" may refer to a function for converting image data in which each pixel includes only one color information (i.e., any one of R, B, and W) into RGB image data in which each pixel includes information about three colors (R, G, and B).

Such demosaicing may be performed by the image signal processor 210. More specifically, the image signal processor 210 may include a line memory and a processing block. The line memory may temporarily store image data IDATA received from the output interface 190. The processing block may process image data stored in the line memory. For example, the processing block may include various kinds of image processing (e.g., demosaicing, hue correction, image quality correction, size adjustment, etc.).

The demosaicing method shown in FIG. 4 is discussed based on an example where the image data 600 having the (6×6) resolution is demosaiced into RGB image data 610, 620, and 630, each of which has the (2×2) resolution. In this case, resolution conversion may also be performed by the demosaicing method shown in FIG. 4.

In more detail, a first pixel group PG1 indicating image data corresponding to the pixels contained in the (3×3) matrix may be converted into red color image data R1 about a single pixel, green color image data G1 about a single pixel, and blue color image data B1 about a single pixel. In this case, an aggregate (or set) of the red color image data R1, the green color image data G1, and the blue color image data B1 may be defined as RGB image data about the first pixel group PG1.

Likewise, the second, third, and fourth pixel groups PG2, PG3, and PG4, each of which is image data corresponding to pixels arranged in the (3×3) matrix, may be converted into red color image data R2-R4 about a single pixel, green color image data G2-G4 about a single pixel, and blue color image data B2-B4 about a single pixel, respectively. In addition, an aggregate of the red color image data R2, the green color image data G2, and the blue color image data B2 may be defined as RGB image data about the second pixel group PG2. An aggregate of the red color image data R3, the green color image data G3, and the blue color image data B3 may be defined as RGB image data about the third pixel group PG3. An aggregate of the red color image data R4, the green color image data G4, and the blue color image data B4 may be defined as RGB image data about the fourth pixel group PG4.

FIGS. 5A-5C illustrate examples of the first pixel group based on some embodiments of the disclosed technology where image data 600 is obtained from pixels that are arranged as in the first pixel array 400.

In FIG. 5A, a first pixel group PG1*a* may be configured based on a red color-first array structure (hereinafter referred to as "R-first array") in which a first pixel located at a left upper end is a red color pixel (R). In this case, the image data 600 may include pixel data of pixels contained in the first pixel array 400, such that each of the second to fourth pixel groups may also be configured based on the R-first array structure.

Subsequently, a method for converting the first pixel group PG1*a* into red color image data R1, green color image data G1, and blue color image data B1 will hereinafter be described with reference to the attached drawings.

In an embodiment, the first pixel group PG1*a* may be converted into RGB image data by summing image data of the same color. For example, the red color image data R1 may be obtained by summing pixel data of three red color pixels contained in the first pixel group PG1*a*. The blue color image data B1 may be obtained by summing pixel data of three blue color pixels contained in the first pixel group PG1*a*. In addition, the green color image data G1 may be obtained by subtracting the red color image data R1 and the blue color image data B1 from the sum of pixel data of three white color pixels.

In another embodiment, the first pixel group PG1*a* may be converted into RGB image data based on average values of image data of the same color. For example, red color image data R1 may be obtained by averaging pixel data of three red color pixels contained in the first pixel group PG1*a*. Blue color image data B1 may be obtained by averaging pixel data of three blue color pixels contained in the first pixel group PG1*a*. In addition, green color image data G1 may be obtained by subtracting the red color image data R1 and the blue color image data B1 from an average value of pixel data of three white color pixels.

As discussed above, green color pixel values can be obtained by subtracting blue color pixel values and red color pixel values from white color pixel values based on some embodiments of the disclosed technology. In another implementation, green color image data may be calculated by applying the sum of pixel data of three white color pixels or the average value of pixel data of three white color pixels to the calculation result of red color image data and blue color image data.

As described above, the first pixel group PG1a including pixel data about the (3×3) pixels based on the R-first array structure may be converted into RGB image data. Likewise, each of the second to fourth pixel groups, each of which includes pixel data about the (3×3) pixels based on the R-first array structure may be converted into RGB image data corresponding to a single pixel.

In FIG. 5B, a first pixel group PG1b may be configured based on a white color-first array structure (hereinafter referred to as "W-first array") in which a first pixel located at a left upper end is a white color pixel (W). In this case, the image data 600 may include pixel data of pixels contained in the first pixel array 400, such that each of the second to fourth pixel groups are arranged based on the W-first array structure.

The first pixel group PG1b may be converted into RGB image data based on the summation method or the averaging method discussed above.

As described above, the first pixel group PG1b including pixel data of pixels contained in the (3×3) matrix based on the W-first array structure may be converted into RGB image data corresponding to a single pixel. Likewise, each of the second to fourth pixel groups, each of which includes pixel data about the (3×3) pixels based on the W-first array structure may be converted into RGB image data corresponding to a single pixel.

In FIG. 5C, a first pixel group PG1c may be configured based on a blue color-first array structure (hereinafter referred to as "B-first array") in which a first pixel located at a left upper end is a blue color pixel (B). In this case, the image data 600 may include pixel data of pixels contained in the first pixel array 400, such that each of the second to fourth pixel groups are arranged based on the B-first array structure.

The first pixel group PG1c may be converted into RGB image data based on the summation method or the averaging method. The summation method or the averaging method discussed above may be applied to the first pixel group PG1c.

As described above, the first pixel group PG1c including pixel data of pixels contained in the (3×3) matrix based on the B-first array structure may be converted into RGB image data corresponding to a single pixel. Likewise, each of the second to fourth pixel groups, each of which includes pixel data about the (3×3) pixels based on the B-first array structure may be converted into RGB image data corresponding to a single pixel.

Even when the image data 600 is identical to image data of pixels arranged based on the second pixel array 500, the summation method or the average method may be applied to each of pixel groups of the R-first array structure, the W-first array structure, or the B-first array structure, such that each pixel group can be converted into RGB image data.

As described above, image data 600 that includes pixel data of the red color pixel (R), pixel data of the blue color pixel (B), and pixel data of the white color pixel (W) may be converted into RGB image data for each pixel group (e.g., PG1a) including pixels contained in the (3×3) matrix.

Figure 6:
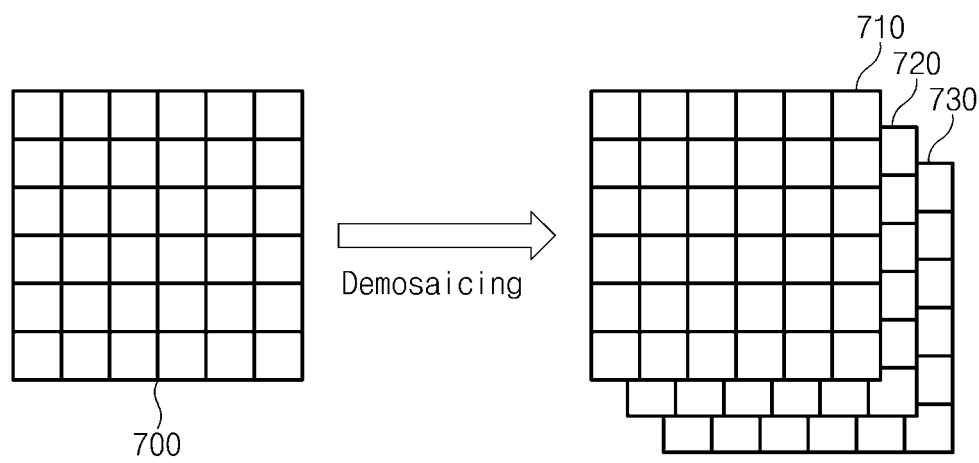
FIG. 6 is a schematic diagram illustrating a method for demosaicing pixels of a first pixel array or pixels of a second pixel array based on another embodiment of the disclosed technology.

FIG. 6 is a schematic diagram illustrating a method for demosaicing pixels of the first pixel array or pixels of the second pixel array based on another embodiment of the disclosed technology. FIG. 7 is a conceptual diagram illustrating a detailed example of the demosaicing method shown in FIG. 6.

Image data 700 of pixels that are arranged based on the first pixel array 400 or the second pixel array 500 are shown in FIG. 6. The image data 700 may include pixel data of pixels arranged in the (6×6) matrix.

The image data 700 having a (6×6) resolution may be demosaiced into RGB data 710-730, each of which has the (6×6) resolution. Such demosaicing method may be performed by the image signal processor 210 in the same manner as in FIG. 4.

The demosaicing method shown in FIG. 6 is discussed based on an example where image data 700 having the (6×6) resolution is demosaiced into RGB image data 710-730 having the (6×6) resolution. If necessary, resolution conversion of FIG. 6 may not be performed unlike FIG. 4.

In addition, the image data 700 may be demosaiced on a mask basis. Here, the mask may refer to an aggregate of pixels arranged in the (3×3) matrix, and the center point of the mask may refer to a target pixel to which demosaicing is applied. That is, a method for demosaicing the target pixel corresponding to any one of pixels contained in the image data 700 may be carried out using the mask centering upon the target pixel.

The above-mentioned demosaicing operation will hereinafter be described with reference to FIG. 7.

Referring to FIG. 7, the image data 700 may have a (6×6) resolution, and pixels may be arranged based on the first pixel array 400. Even in the other case in which the image data 700 is configured in a manner that pixels are arranged based on the second pixel array 500, the following demosaicing method can also be applied to the other case in the same or similar manner. In FIG. 7, the numbers following each character "R", "W", or "B" indicate row and column to which the corresponding pixel belongs.

The method for demosaicing pixel data of a specific pixel B32 will hereinafter be described with reference to the attached drawings. A first mask MSK1 formed in the (3×3) matrix centering upon a specific pixel B32 may be established.

In an embodiment, the first mask MSK1 may be converted into RGB image data of the specific pixel B32 based on the summation method. For example, red color image data may be obtained by summing pixel data of three red color pixels R22, R33, and R41 contained in the first mask MSK1. Blue color image data may be obtained by summing pixel data of three blue color pixels B21, B32, and B43 contained in the first mask MSK1. In addition, green color image data may be obtained by subtracting the blue color image data (sum of B21, B32, and B43 values) and the red color image data (sum of R22, R33, and R41 values) from the sum of pixel data of three white color pixels (W23, W31, and W42).

In another embodiment, the first mask MSK1 may be converted into RGB image data of the specific pixel B32 based on the averaging method. For example, red color image data may be obtained by averaging pixel data of three red color pixels R22, R33, and R41 contained in the first mask MSK1. Blue color image data may be obtained by averaging pixel data of three blue color pixels B21, B32, and B43 contained in the first mask MSK1. In addition, green color image data may be calculated by subtracting the sum of both the average value of three red color pixels (R22, R33, and R41) and the average value of three blue color pixels (B21, B32, and B43) from the average value of pixel data of three white color pixels (W23, W31, and W42).

In still another embodiment, when the summation method or the averaging method is applied to the first mask MSK1, a weight based on a relative distance between the corresponding pixel and the target pixel B32 may be reflected in the process of applying the summation method or the averaging method to the first mask MSK1. For example, when red color image data is calculated using the averaging method, a weight of 0.7 may be multiplied by each of the red color pixels R22 and R33 located in the vertical or horizontal direction of the target pixel B32, and a weight of 0.5 may be multiplied by the red color pixel R21 located in the diagonal direction of the target pixel B32, such that the average value can be calculated based on the multiplication results. In addition, when blue color image data is calculated using the averaging method, a weight of 1 may be multiplied by the target pixel B32, and a weight of 0.5 may be multiplied by each of blue color pixels B21 and B43 located in the diagonal direction of the target pixel B32, such that the average value can be calculated based on the multiplication results. In addition, when green color image data is calculated using the averaging method, a weight of 0.7 may be multiplied by each of white color pixels W31 and W42 located in the vertical or horizontal direction of the target pixel B32, and a weight of 0.5 may be multiplied by the white color pixel W23 located in the diagonal direction of the target pixel B32, such that the average value can be calculated based on the multiplication results.

Subsequently, the demosaicing operation for pixel data of a specific white color pixel W45 will hereinafter be described with reference to the attached drawings. A second mask MSK2 formed in the (3×3) matrix centering upon the white color pixel W45 may be established.

In an embodiment, the second mask MSK2 may be converted into RGB image data of the white color pixel W45 based on the summation method. For example, red color image data may be obtained by summing pixel data of three red color pixels (R36, R44, and R55) contained in the second mask MSK2. Blue color image data may be obtained by summing pixel data of three blue color pixels (B35, B46, and B54) contained in the second mask MSK2. In addition, green color image data may be obtained by subtracting both the sum of pixel data of three red color pixels (R36, R44, and R55) and the sum of pixel data of three blue color pixels (B35, B46, and B54) from the sum of pixel data of three white color pixels (W34, W45, and W56).

In another embodiment, the second mask MSK2 may be converted into RGB image data of the white color pixel W45 based on the averaging method. For example, red color image data may be obtained by averaging pixel data of three red color pixels (R36, R44, and R55) contained in the second mask MSK2. Blue color image data may be obtained by averaging pixel data of three blue color pixels (B35, B46, and B54) contained in the second mask MSK2. In addition, green color image data may be calculated by subtracting both the average value of pixel data of three red color pixels (R36, R44, and R55) and the average value of pixel data of three blue color pixels (B35, B46, and B54) from the average value of pixel data of three white color pixels (W34, W45, and W56).

In still another embodiment, when the summation method or the averaging method is applied to the second mask MSK2, a weight based on a relative distance to the target pixel W45 may be reflected in the process of applying the summation method or the averaging method to the second mask MSK2. For example, when red color image data is calculated using the averaging method, a weight of 0.7 may be multiplied by each of the red color pixels R44 and R55 located in the vertical or horizontal direction of the target pixel W45, and a weight of 0.5 may be multiplied by the red color pixel R36 located in the diagonal direction of the target pixel W45, such that the average value can be calculated based on the multiplication results. In addition, when blue color image data is calculated using the averaging method, a weight of 0.7 may be multiplied by each of blue color pixels B35 and B46 located in the vertical or horizontal direction of the target pixel W45, and a weight of 0.5 may be multiplied by the blue color pixel B54 located in the diagonal direction of the target pixel W45, such that the average value can be calculated based on the multiplication results. In addition, when green color image data is calculated using the averaging method, a weight of 1 may be multiplied by the target pixel W45, and a weight of 0.5 may be multiplied by each of white color pixels W34 and W56 located in the diagonal direction of the target pixel W45, such that the average value can be calculated based on the multiplication results.

As described above, RGB image data about the target pixel may be created using the mask centering upon the target pixel.

The image sensor 100 and the method for demosaicing the same based on some embodiments of the disclosed technology can omit at least one green color pixel which requires a high amount of light even when pixel sensitivity is low to improve the sensitivity of the entire pixel array, resulting in formation of high-quality images even when a low amount of light is provided.

The image sensor 100 and the method for demosaicing the same based on some embodiments of the disclosed technology can allow (3×3) pixels but not (2×2) pixels (e.g., Bayer pattern) to decide RGB image data of a single pixel, resulting in formation of higher-quality images regardless of a lower amount of light or a smaller-sized pixel.

In addition, when implementing high-quality pixels through computation, the high-quality pixels need not be implemented in a complicated manner through rearrangement of pixels, such that distortion of image-quality can be minimized.

It is understood that various embodiments and terminology used herein are not intended to limit technical ideas described in this document to specific embodiments, but rather to include various modifications, equivalents, and/or alternatives of the embodiments.

What is claimed is:

1. An image processing system comprising:
   an active pixel sensor (APS) block including a plurality of (3×3) demosaicing matrices of imaging pixels arranged in columns and rows, each (3×3) demosaicing matrix including three red color pixels, three blue color pixels, and three white color pixels; and
   an image signal processor configured to perform demosaicing for each of the demosaicing matrices,
   wherein:
   each of the (3×3) demosaicing matrices constitutes a mask to produce image data corresponding to pixels contained in the (3×3) demosaicing matrix;
   the image signal processor converts the image data of the mask into red color image data, green color image data, and blue color image data about a target pixel located at a center point of the mask;

the mask includes a first pixel having a first distance from the target pixel and a second pixel having a second distance from the target pixel;

the second distance is greater than the first distance;

the first pixel and the second pixel correspond to the same color;

the image processor applies a first weight to the first pixel and a second weight, smaller than the first weight, to the second pixel; and when the target pixel corresponds to a first color, the image signal processor generates image data of the first color for the target pixel based on pixel data of the target pixel and pixel data of remaining pixels corresponding to the first color in the mask, by applying, to the target pixel, a weight greater than weights applied to the remaining pixels.

2. The image processing system according to claim 1, wherein the red color pixels, the blue color pixels, and the white color pixels are arranged in a sequence of red color pixel, white color pixel, and blue color pixel in a direction.

3. The image processing system according to claim 1, wherein the red color pixels, the blue color pixels, and the white color pixels are arranged a sequence of red color pixel, blue color pixel, and white color pixel in a direction.

4. The image processing system according to claim 1, wherein:

each of the (3×3) demosaicing matrices constitutes a pixel group to produce image data corresponding to pixels contained in the (3×3) demosaicing matrix; and the image signal processor converts the image data of the pixel group into red color image data, green color image data, and blue color image data about a single pixel.

5. The image processing system according to claim 4, wherein the image signal processor is configured to:

generate the red color image data by calculating a sum of pixel data of three red color pixels contained in the pixel group;

generate the blue color image data by calculating a sum of pixel data of three blue color pixels contained in the pixel group; and generate the green color image data by calculating a sum of pixel data of three white color pixels contained in the pixel group, and using the red color image data and the blue color image data.

6. The image processing system according to claim 4, wherein the image signal processor is configured to:

generate the red color image data by calculating an average value of pixel data of three red color pixels contained in the pixel group;

generate the blue color image data by calculating an average value of pixel data of three blue color pixels contained in the pixel group; and generate the green color image data by calculating an average value of pixel data of three white color pixels contained in the pixel group, and using the red color image data and the blue color image data.

7. The image processing system according to claim 4, wherein pixels in the pixel group are arranged such that one of the red color pixels is arranged at a corner of each of the (3×3) demosaicing matrices.

8. The image processing system according to claim 4, wherein pixels in the pixel group are arranged such that one of the white color pixels is arranged at a corner of each of the (3×3) demosaicing matrices.

9. The image processing system according to claim 4, wherein pixels in the pixel group are arranged such that one of the blue color pixel is placed at a corner of each of the (3×3) demosaicing matrices.

10. The image processing system according to claim 1, wherein the image signal processor is configured to:

generate the red color image data by calculating a sum of pixel data of three red color pixels contained in the mask;

generate the blue color image data by calculating a sum of pixel data of three blue color pixels contained in the mask; and generate the green color image data by calculating a sum of pixel data of three white color pixels contained in the mask, and using the red color image data and the blue color image data.

11. The image processing system according to claim 1, wherein the image signal processor is configured to:

generate the red color image data by calculating an average value of pixel data of three red color pixels contained in the mask;

generate the blue color image data by calculating an average value of pixel data of three blue color pixels contained in the mask; and generate the green color image data by calculating an average value of pixel data of three white color pixels contained in the mask, and using the red color image data and the blue color image data.

12. An image signal processor comprising:

a line memory configured to temporarily store image data that includes pixel data of each red color pixel, pixel data of each blue color pixel, and pixel data of each white color pixel; and a processing block configured to perform demosaicing of the image data on a demosaicing matrix basis, each demosaicing matrix including three red color pixels, three blue color pixels, and three white color pixels, wherein the pixel data is generated by an active pixel sensor (APS) block including a plurality of (3×3) matrices of imaging pixels arranged in columns and rows, each (3×3) matrix including the three red color pixels, the three blue color pixels, and the three white color pixels, wherein:

each of the (3×3) matrices constitutes a mask to produce image data corresponding to pixels contained in the (3×3) matrix;

the processing block converts the image data of the mask into red color image data, green color image data, and blue color image data about a target pixel located at a center point of the mask;

the mask includes a first pixel having a first distance from the target pixel and a second pixel having a second distance from the target pixel;

the second distance is greater than the first distance;

the first pixel and the second pixel correspond to the same color;

the processing block applies a first weight to the first pixel and a second weight, smaller than the first weight, to the second pixel; and when the target pixel corresponds to a first color, the processing block generates image data of the first color for the target pixel based on pixel data of the target pixel and pixel data of remaining pixels corresponding to the first color in the mask, by applying, to the target pixel, a weight greater than weights applied to the remaining pixels.

13. The image signal processor according to claim 12, wherein:
   the demosaicing matrix constitutes a pixel group to produce image data corresponding to pixels contained in the (3×3) matrix,
   wherein the pixel group is converted into red color image data, green color image data, and blue color image data about a single pixel.

* * * * *